United States Patent
Son

(10) Patent No.: US 7,791,690 B2
(45) Date of Patent: Sep. 7, 2010

(54) LIQUID CRYSTAL DISPLAY DEVICE AND METHOD OF FABRICATING THE SAME

(75) Inventor: Dong Soo Son, Suwon-si (KR)

(73) Assignee: Samsung Mobile Display Co., Ltd., Suwon-si, Gyeonggi-do (KR)

( * ) Notice: Subject to any disclaimer, the term of this patent is extended or adjusted under 35 U.S.C. 154(b) by 247 days.

(21) Appl. No.: 12/068,423

(22) Filed: Feb. 6, 2008

(65) Prior Publication Data

US 2008/0186435 A1    Aug. 7, 2008

(30) Foreign Application Priority Data

Feb. 7, 2007    (KR) .................. 10-2007-0012869

(51) Int. Cl.
*G02F 1/1335* (2006.01)
(52) U.S. Cl. ...................... 349/106; 349/109
(58) Field of Classification Search ................ 349/109
See application file for complete search history.

(56) References Cited

U.S. PATENT DOCUMENTS 7,248,329 B2    7/2007    Park et al.

| | | | |
|---|---|---|---|
| 2005/0179853 A1* | 8/2005 | Chen et al. | 349/155 |
| 2006/0097414 A1* | 5/2006 | Chae et al. | 264/1.27 |
| 2007/0132921 A1* | 6/2007 | Yoon | 349/107 |
| 2008/0117378 A1* | 5/2008 | Son et al. | 349/155 |

FOREIGN PATENT DOCUMENTS

| | | |
|---|---|---|
| JP | 11-212075 | 8/1999 |
| JP | 2002-040407 | 2/2002 |
| JP | 2006-078540 | 3/2006 |
| KR | 10-2004-0092598 A | 11/2004 |
| KR | 10-2005-0121882 A | 12/2005 |

\* cited by examiner

*Primary Examiner*—Omar Rojas
(74) *Attorney, Agent, or Firm*—Lee & Morse, P.C.

(57) ABSTRACT

A liquid crystal display device includes a black matrix between first and second substrates, the black matrix having openings defined therein, color filters between the first and second substrates and aligned with the openings defined in the black matrix, the color filters including first filters having a first color, second filters having a second color, and third filters having a third color; and spacers configured to maintain a predetermined cell gap. The second filters have a recess, such that the second filters have an area that is less than an area of the first filters, the spacers are aligned with regions of the black matrix adjacent to the recesses in the second filters, and alignment layers are on the first and second substrates.

20 Claims, 4 Drawing Sheets

LIQUID CRYSTAL DISPLAY DEVICE AND METHOD OF FABRICATING THE SAME

BACKGROUND OF THE INVENTION

1. Field of the Invention

Embodiments relate to a liquid crystal display device and a method of fabricating the same. More particularly, embodiments relate to a liquid crystal display device having a black matrix with a predetermined distance around a patterned spacer, and a method of fabricating the same.

2. Description of the Related Art

A liquid crystal display device is a flat panel display device widely used in televisions, computers, mobile devices, embedded applications, etc. The liquid crystal display device utilizes unique physical and optical properties of a liquid crystal. Generally, the liquid crystal is arranged between two substrates having a pattern of electrodes, e.g., transparent electrodes, the two substrates being sealed with a sealing agent and kept separated by spacers arranged between the two sealed substrates.

The spacer serves to maintain a constant distance, or cell gap, between the two substrates. A ball spacer, e.g., a generally spherical spacer, has been widely used, but such ball spacers tend to be nonuniformly arranged on the substrate. The low aspect ratio of the ball may reduce the aperture ratio and transmittance of the liquid crystal display device. Further, the nonuniform distribution of the ball spacers may make it difficult or impossible to maintain a constant cell gap.

SUMMARY OF THE INVENTION

Embodiments are therefore directed to a liquid crystal display device and method of fabricating the same, which substantially overcome one or more of the problems due to the limitations and disadvantages of the related art.

It is therefore a feature of an embodiment to provide a liquid crystal display device having spacers aligned on a black matrix, and having color filters and the black matrix configured to provide a predetermined distance around the spacers.

It is therefore another feature of an embodiment to provide a method of fabricating a liquid crystal display device that includes forming color filters, a black matrix, and spacers aligned with the black matrix such that a predetermined distance between a color filter area and the spacers is provided.

At least one of the above and other features and advantages may be realized by providing a liquid crystal display device, including a black matrix between first and second substrates, the black matrix having openings defined therein, color filters between the first and second substrates and aligned with the openings defined in the black matrix, the color filters including first filters having a first color, second filters having a second color, and third filters having a third color, and spacers configured to maintain a predetermined cell gap. The second filters may have a recess, such that the second filters have an area that is less than an area of the first filters, the spacers may be aligned with regions of the black matrix adjacent to the recesses in the second filters, and alignment layers may be on the first and second substrates.

The first substrate may include first electrodes extending in a first direction, the second substrate may include second electrodes extending in a second direction and crossing the first electrodes, and the openings in the black matrix may correspond to overlapping regions of the first and second electrodes. The first filters may have a shape corresponding to the overlapping regions of the first and second electrodes. The color filters may be arranged in a stripe pattern, the second filters may be immediately adjacent to each other in a first direction, and the second filters may alternate with the first and third filters in a second direction.

Immediately adjacent second filters may have recesses facing one another. The black matrix may include first portions extending in the first direction, the black matrix may include second portions extending in the second direction and passing between the immediately adjacent second filters, the second portions may be wider in regions between the facing recesses of the second filters than in regions between facing portions of immediately adjacent first filters, and the spacers may be aligned with the wider regions.

The first substrate may include first electrodes extending in the first direction, the second substrate may include second electrodes extending in the second direction and crossing the first electrodes, and the openings in the black matrix may correspond to overlapping regions of the first and second electrodes. The first filters may not be recessed and the first color may be red. The recesses may be defined by angled sides of the second filters.

At least one of the above and other features and advantages may also be realized by providing a method of fabricating a liquid crystal display device, the method including forming a black matrix between first and second substrates, the black matrix having openings defined therein, forming color filters between the first and second substrates such that the color filters are aligned with the openings defined in the black matrix, the color filters including first filters having a first color, second filters having a second color, and third filters having a third color, and forming spacers configured to maintain a predetermined cell gap. The second filters may be formed to have a recess, such that the second filters are formed with an area that is less than an area of the first filters, and the spacers may be formed to be aligned with regions of the black matrix adjacent to the recesses in the second filters. Alignment layers may be formed on the first and second substrates.

The first substrate may include first electrodes extending in a first direction, the second substrate may include second electrodes extending in a second direction and crossing the first electrodes, and the openings in the black matrix may correspond to overlapping regions of the first and second electrodes. The first filters may be formed to have a shape corresponding to the overlapping regions of the first and second electrodes.

The color filters may be arranged in a stripe pattern, the second filters may be immediately adjacent to each other in a first direction, and the second filters may alternate with the first and third filters in a second direction. Immediately adjacent second filters may be formed to have recesses facing one another. The black matrix may include first portions extending in the first direction, the black matrix may include second portions extending in the second direction and passing between the immediately adjacent second filters, the second portions may be wider in regions between the facing recesses of the second filters than in regions between facing portions of immediately adjacent first filters, and the spacers may be aligned with the wider regions.

The first substrate may include first electrodes extending in the first direction, the second substrate may include second electrodes extending in the second direction and crossing the first electrodes, and the openings in the black matrix may correspond to overlapping regions of the first and second electrodes. The first filters may not be recessed and the first color may be red. The recesses may be defined by angled sides of the second filters. Forming the spacers may include forming a spacer material layer on the second substrate, and patterning the spacer material layer to form the spacers aligned with regions of the black matrix adjacent to the recesses in the second filters. Forming the alignment layer on the second substrate may include performing a rubbing operation to form an alignment pattern after patterning the spacer material layer.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
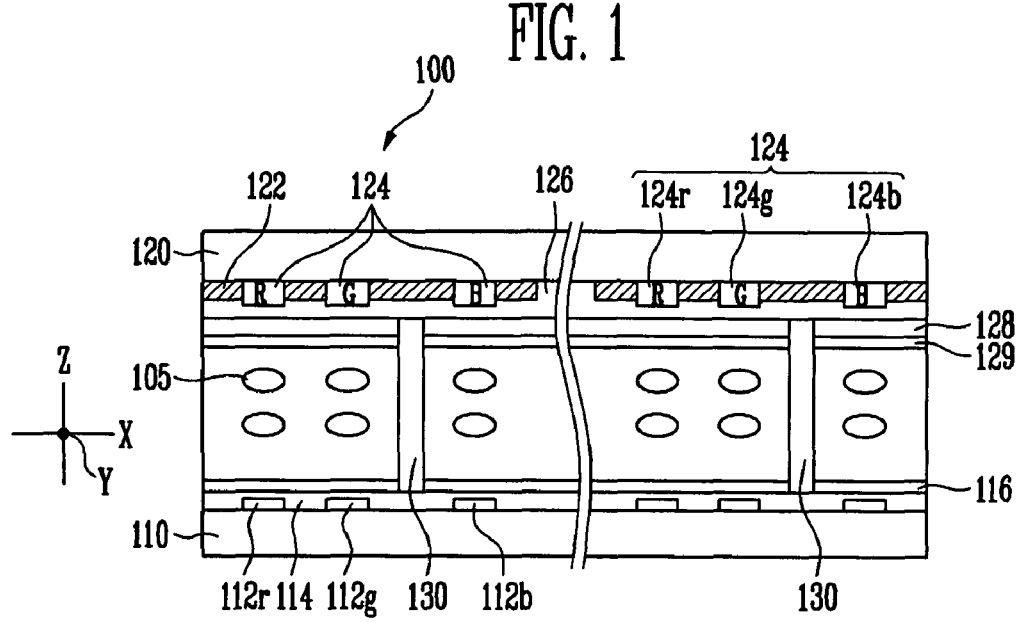
FIG. 1 illustrates a schematic cross-sectional view of a liquid crystal display device according to an embodiment.

Korean Patent Application No. 10-2007-0012869, filed on Feb. 7, 2007, in the Korean Intellectual Property Office, and entitled: "Liquid Crystal Display Device and Method of Fabricating the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
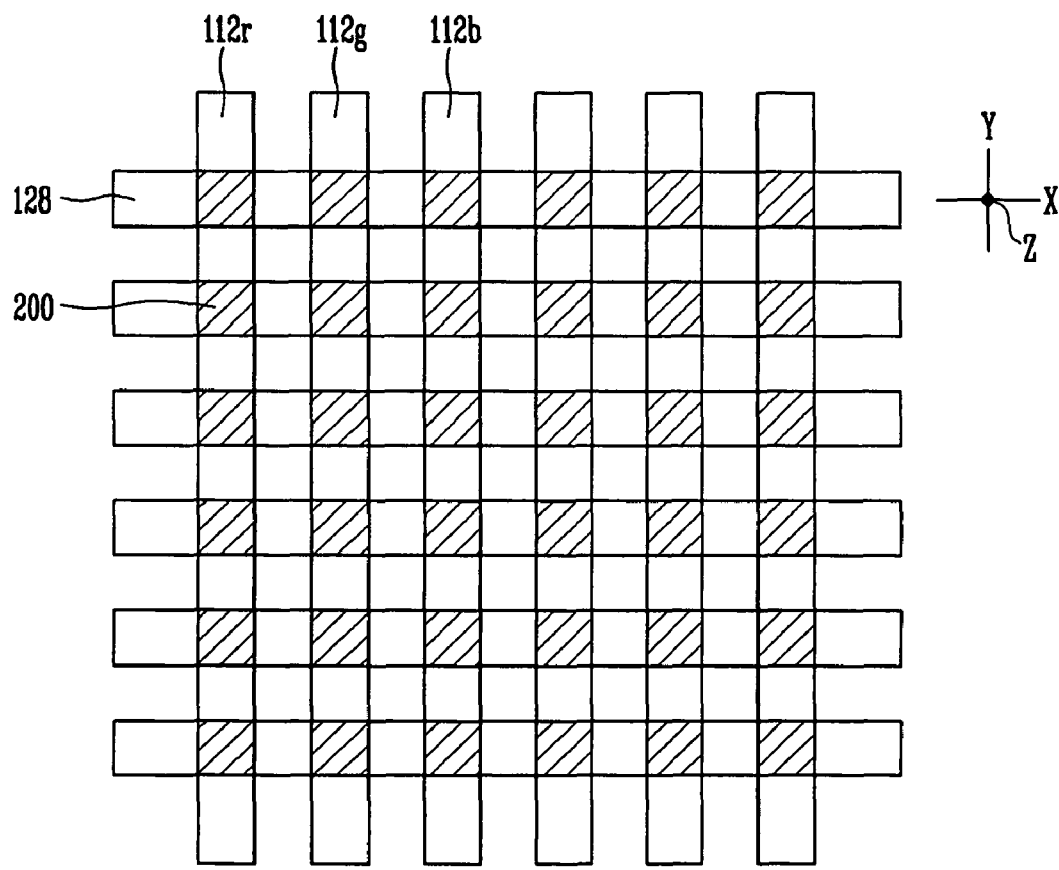
FIG. 2 illustrates a configuration of first and second electrodes in the liquid crystal display device of FIG. 1.

FIG. 1 illustrates a schematic cross-sectional view of a liquid crystal display device 100 according to an embodiment, and FIG. 2 illustrates a configuration of first and second electrodes in the liquid crystal display device 100 of FIG. 1. Referring to FIGS. 1 and 2, the liquid crystal display device 100 may be, e.g., a passive matrix mode device in which liquid crystal is sandwiched between an electrode lead (segment) and an electrode plate (common), wherein subpixels are driven by two opposing electrodes. The liquid crystal display device 100 may be, e.g., a twisted nematic liquid crystal display device (TN-LCD), a super twisted nematic liquid crystal display device (STN-LCD), etc. In an implementation, the liquid crystal display device 100 may be a STN-LCD having an angle of twist of about 240° to about 270°, and may exhibit a transmittance that changes sharply according to an applied voltage. The STN-LCD may be desirable for a passive matrix mode liquid crystal display device, since the change in the arrangement of the liquid crystal molecules may be high for changes in voltage adjacent to the threshold voltage.

The liquid crystal display device 100 may include a first substrate 110 and a second substrate 120 arranged to face the first substrate 110, as well as spacers 130, e.g., patterned column spacers or photo spacers, formed in predetermined regions of the second substrate 120 and maintaining a cell gap between the first and second substrates 110 and 120. The spacers 130 may extend between the substrates 110 and 120, e.g., parallel to the Z axis direction shown in FIGS. 1 and 2. In an implementation, the liquid crystal display device 100 may be a passive matrix mode device in which the spacers 130 have a diameter of about 17 μm. A liquid crystal 105 may be injected between the first and second substrates 110 and 120.

In greater detail, a first alignment layer 116 and a second alignment layer 129 may be formed at facing surfaces of the first and second substrates 110 and 120, respectively. The first and second alignment layers 116 and 129 may each have alignment patterns formed therein, the alignment patterns determining an alignment angle of the liquid crystal. The alignment patterns may be formed by, e.g., a rubbing operation. In an implementation, the alignment layers 116 and 129 may be formed on planarization layers 114 and 126, respectively.

First electrodes 112 may be formed in a pattern on the first substrate 110, and second electrodes 128 may be formed in a pattern on the second substrate 120. The first electrodes 112 may extend in a first direction, e.g., parallel to the Y axis shown in FIGS. 1 and 2. The second electrodes may extend in a second direction, e.g., parallel to the X axis shown in FIGS. 1 and 2. The second electrodes 128 may be arranged to cross the first electrodes 112, e.g., at right angles so as to be perpendicular to the first electrodes 112, etc. The first electrodes 112 may include electrodes 112r, 112g, and 112b corresponding to red, green, and blue subpixels 200, respectively. Regions of overlap between the first electrodes 112 and the second electrodes 128 may correspond to subpixels 200. For example, a subpixel 200 may be formed at each position where a first electrode 112 and a second electrode 128 cross each other, as shown in FIG. 2. One subpixel 200 of each color may be disposed between spacers 130 that are immediately adjacent to one another in the second direction. For example, a pattern of a spacer 130, one each of red, green and blue subpixels 200, a second spacer 130, a second one of each of red, green and blue subpixels 200, etc., may be arranged in sequence along the X axis direction.

The second substrate 120 may include a black matrix 122 surrounding color filters 124 in the subpixels 200. The black matrix 122 may be a non-display region serving as an optical barrier layer for preventing image quality degradation due to optical leakage between the subpixels 200. The color filters 124, e.g., red (R), green (G) and blue (B) color filters 124r, 124g, and 124b, may be respectively formed in openings defined in the black matrix 122.

Figure 3:
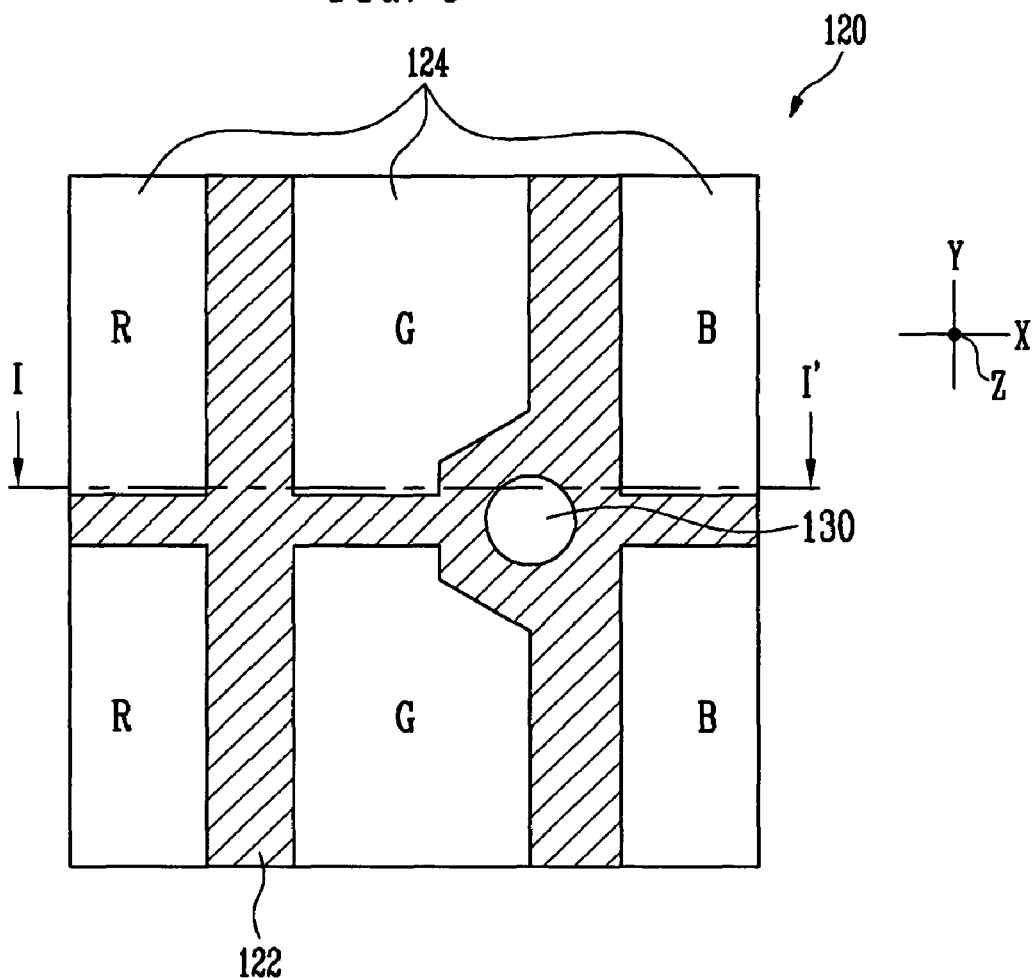
FIG. 3 illustrates a plan view of a color filter substrate of the liquid crystal display device of FIG. 1.

FIG. 3 illustrates a plan view of the second substrate 120 of the liquid crystal display device 100. Referring to FIG. 3, the liquid crystal display device 100 may have the black matrix 122 and at least one of the color filters 124 shaped so as to provide an enlarged black matrix region around the spacers 130. For example, a side of a predetermined one of the red, green or blue color filters 124r, 124g or 124b may be recessed corresponding to an enlarged portion of the black matrix 122. In an implementation, the color filters having the recesses may be the green color filters 124g. In another implementation the color filters having the recesses may be the blue color filters 124b. In an implementation, facing sides of the predetermined color of the color filters 124, e.g., facing sides of the green color filters 124g, or facing sides of the blue color filters 124b, may be patterned to have mirror-image recesses therein, as illustrated by the green color filters 124g in FIG. 3.

The enlarged black matrix region 122 corresponding to the recesses of the color filters 124 may provide a larger distance, e.g., a constant distance provided by the recessed shape, between the spacers 130 and the color filters 124 than would exist if no recess were provided in the color filters 124. Thus, the arrangement illustrated in FIG. 3 may help prevent light leakage in the subpixels 200 adjacent to the spacers 130. In particular, in a conventional liquid crystal display device, light leakage caused by nonuniformities in the alignment layer may result where a rubbing operation, used to form the alignment pattern in the alignment layer, is locally disrupted by the presence of protrusions such as spacers. In contrast, the larger distance between the spacers 130 and the color filters 124 in the liquid crystal display device 100 may reduce or eliminate nonuniformities in the alignment layer in the subpixels 200. Thus, it will be appreciated that the enlarged regions of the black matrix 122 provided by the recessed color filters 124 in the liquid crystal display device 100 may further enhance the advantages afforded by the use of patterned spacers as compared to conventional ball spacers. Accordingly, even if a rubbing process is carried out on the second substrate 120, it may be possible to avoid the light leakage phenomenon typically associated with patterned spacers, while obtaining the positive effects, e.g., improved transmittance and uniform cell gaps, afforded by having regularly spaced patterned spacers outside of the subpixels.

Figure 4:
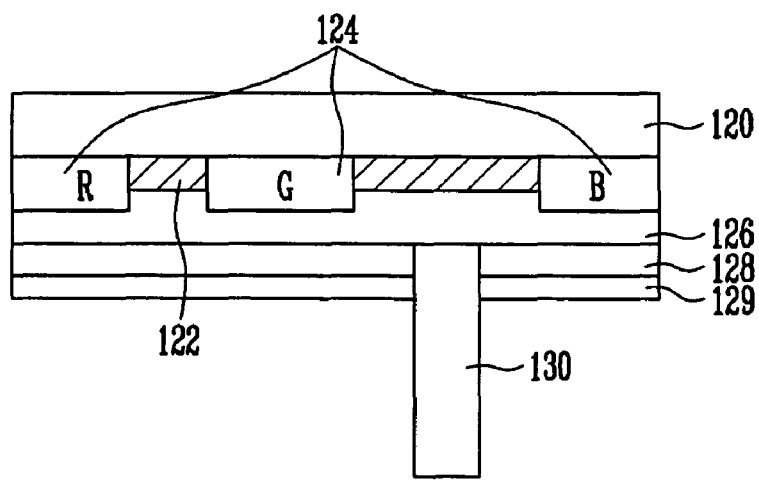
FIG. 4 illustrates a cross-sectional view along a region (I-I') of FIG. 3.

FIG. 4 illustrates a cross-sectional view along a region (I-I') of FIG. 3. Referring to FIGS. 3 and 4, the liquid crystal display device 100 may have the black matrix 122, the color filters 124, the second electrodes 128 and the spacers 130 all formed on the second substrate. The black matrix 122 may be formed on the second substrate 120 in a matrix pattern and may divide pixels into a plurality of subpixels 200 in which the color filters 124 will be subsequently formed. Further, as described above, the black matrix 122 may help prevent light interference between the adjacent subpixels 200 during operation of the liquid crystal display device 100.

The color filters 124 may be formed in the subpixels 200 defined by the black matrix 122. The color filters 124 may be formed by respective red, green and blue color materials, which may produce red, green and blue colors in the subpixels 200 forming one unit pixel. The subpixels 200 may correspond to intersections of the first electrodes 112 and the second electrodes 128, and may have a shape corresponding to the overlapping regions of the intersections, e.g., a generally rectangular shape. As discussed above, the shape may be recessed for a predetermined color of the color filters 124. For example, the green color filters 124g or the blue color filters 124b may be formed with recesses, such that facing sides of adjacent color filters of the same color, e.g., green or blue, are each recessed as compared to the rectangular shapes of the remaining color filters, e.g., blue and red, or green and red, respectively. The shape of the recess is preferably an angle, such as the inclined shape of the green color filters 124g shown in FIG. 3.

The second electrode 128 may be formed on the substrate 120 on which the color filters 124 and the black matrix 122 are formed, and the liquid crystal may be disposed between the first and second substrates 110 and 120. A reference voltage for driving the liquid crystal may be supplied to the second electrodes 128. In an implementation, the planarization layer 126 may be formed on the color filters 124 and the black matrix 122, and the second electrode 128 may be formed on the planarization layer 126. The spacers 130 may be formed on the planarization layer 126 or the second electrode 128 corresponding to the recesses in the color filters 124. In an implementation, the spacers 130 may be formed on the planarization layer 126, as illustrated in FIGS. 1 and 4.

In an implementation, the spacers 130 may be disposed in regions of the black matrix 122 that are enlarged by recessing, e.g., with an inclined shape, predetermined regions of both facing sides of the adjacent color filters 124 having the same color. Recessing both facing sides may be preferable to recessing just one of the facing sides.

Figure 5A:
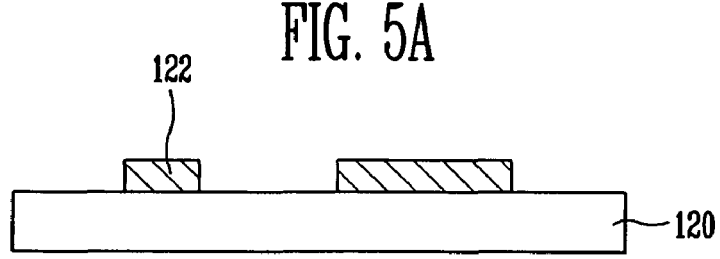
FIG. 5A to FIG. 5E illustrate cross-sectional views of stages in a method of forming a color filter substrate in the liquid crystal display device of FIG. 1.
Figure 5B:
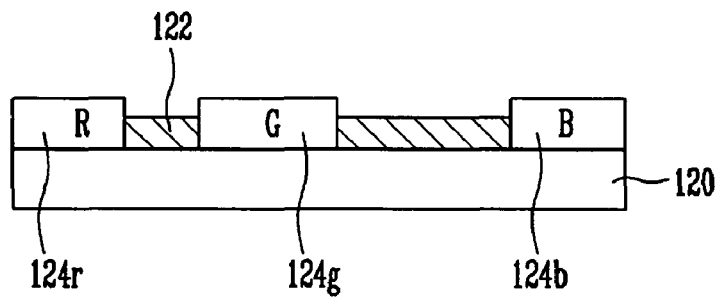
Figure 5C:
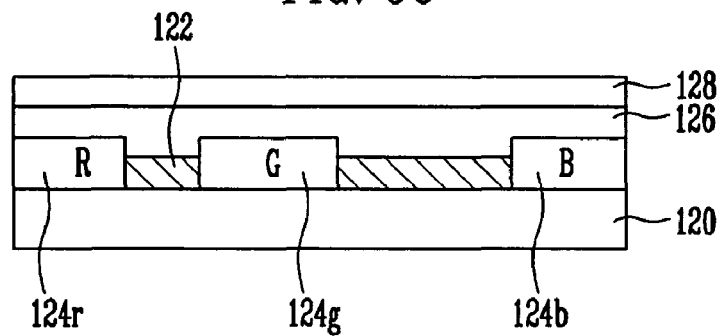
Figure 5D:
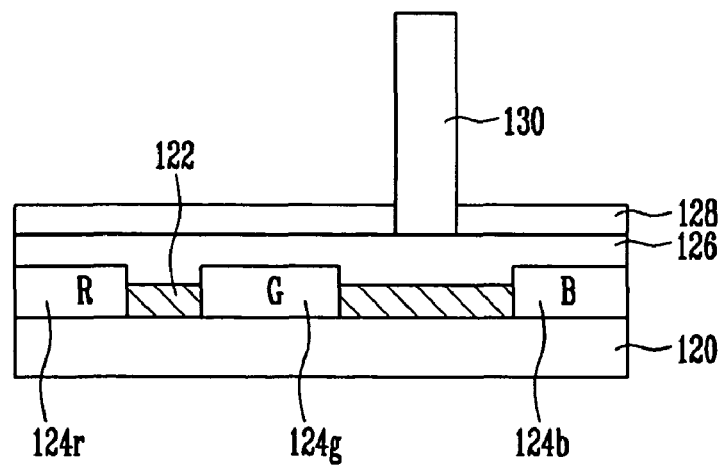
Figure 5E:
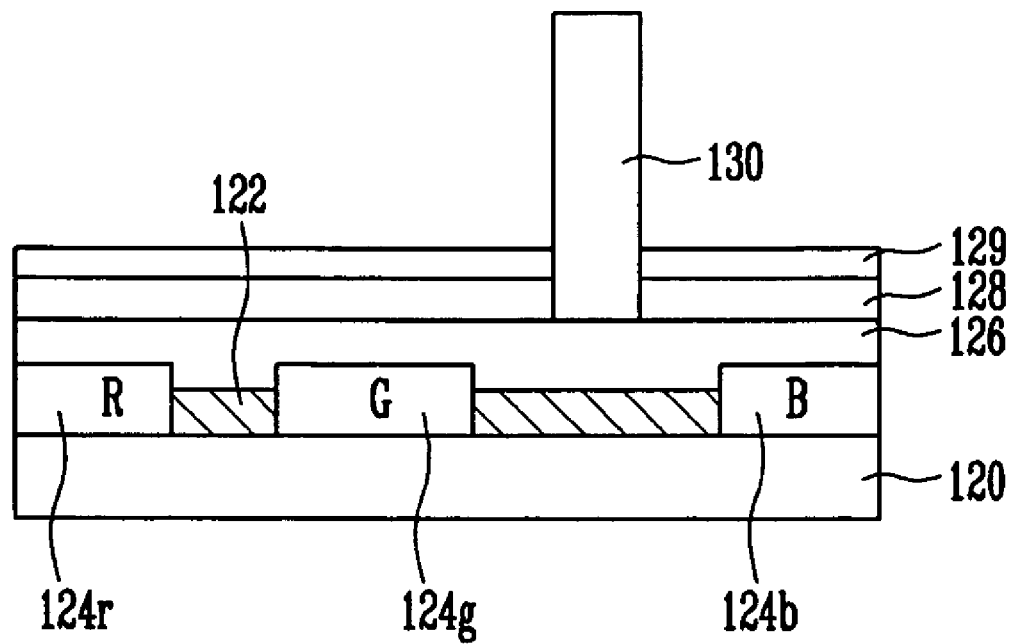

FIG. 5A to FIG. 5E illustrate cross-sectional views of stages in a method of forming a color filter substrate in the liquid crystal display device of FIG. 1, with the view illustrated in FIG. 5E corresponding to that illustrated in FIG. 4. Referring to FIG. 5A, the second substrate 120 may be a transparent substrate. The black matrix 122 may be formed on the second substrate by, e.g., coating the entire substrate 120 with an opaque material layer and patterning the opaque material layer. In an implementation, the opaque material layer may include an opaque metal or opaque resin containing chromium (Cr), and patterning the layer may include forming a photoresist layer on the opaque material and then patterning the photoresist. The photoresist may be patterned in a cutoff region corresponding to a barrier unit of a photomask by lining up the photomask having a predetermined pattern with the second substrate 120 and exposing and developing the photoresist. Then, the black matrix 122 may be formed by patterning the opaque material, e.g. using an etching process through the photoresist pattern.

Referring to FIG. 5B, the second substrate 120 on which the black matrix 122 is formed may be coated with a red color photoresist. In an implementation, the red color photoresist may be soft-baked for a predetermined time on a hot plate having a temperature of, e.g., about 80° C. to about 110° C., exposed using a photomask, and then developed. Subsequently, the developed red color photoresist may be post-baked to form the red color filters 124r in first predetermined openings of the black matrix 122 defined by a surrounding edge of the black matrix 122. Then, the green color filters 124g may be formed in the same manner as described for the red color filters 124r, the green color filters 124g being in second predetermined openings in the black matrix 122 and separated from the red color filters 124r by portions of the black matrix 122. Subsequently, blue color filters 124b may be formed in the same manner as described for the red color filters 124r, the blue color filters 124b being in third predetermined openings in the black matrix 122 and separated from the red and green color filters 124r and 124g by portions of the black matrix 122.

With particular respect to the shapes of the red, green and blue color filters 124r, 124g and 124b, two photomasks, each defining a different shape, may be employed to pattern the respectively colored photoresists. A first photomask may be employed to pattern one or more of the colored photoresists with patterns corresponding to the shape of overlapping regions of the first and second electrodes 112 and 128. A second photomask may be employed to pattern another of the colored photoresists with a recessed pattern. For example, the first photomask may be employed to pattern the red and blue photoresists, and the second photomask may be employed to pattern the green photoresist. In another example, the first photomask may be employed to pattern the red and green photoresists, and the second photomask may be employed to pattern the blue photoresist. The second photomask may generate a shape that is a truncated form, e.g., an oblique shape, of the shape generated by the first photomask. The second photomask may generate pairs of shapes, with each shape having a recess that faces the recess of the opposing shape.

Next, referring to FIG. 5C, a planarization layer 126 and second electrodes 128 may be formed, the planarization layer 126 protecting the black matrix 122 and the color filters 124 from external impacts and environmental factors, as well as enhancing its smoothness. In forming the planarization layer 126, an organic transparent resin, e.g., an acrylate, a polyimide, a polyacrylate, a polyurethane, etc., having high surface hardness and excellent light transmission may be formed to a predetermined thickness and then heated, e.g., for about 1 hour in a baking oven having a temperature of about 200° C. The second electrodes 128 may be configured to apply power to the liquid crystal in cooperation with the first electrodes 112 formed on the first substrate 110 in order to drive the liquid crystal. In forming the second electrodes 128, a transparent metal-containing material, e.g., ITO, etc., may be deposited on the entire surface of the planarization layer 126, e.g., at a thickness of about 1,500 Å to 2,200 Å. The transparent metal-containing material may then be patterned to form the second electrodes 128.

Next, the spacers 130 may be formed on the enlarged regions of the black matrix 122 corresponding to the recessed color filters 124, as shown in FIG. 5D. The patterned spacer 130 may be formed to extend to the planarization layer 126, as illustrated in FIG. 5D. In another implementation (not shown), the spacers 130 may be formed to extend to the second electrodes 128.

In an implementation, forming the spacers 130 may include providing a spacer material mixture, e.g., a mixture of a solvent, a binder, a monomer and a photoinitiator, and printing the spacer mixture material on the substrate. The spacer material mixture may then be dried and the solvent volatilized to form a spacer material in which the binder, the monomer and the photoinitiator are mixed. The spacer material may then be polymerized.

The second substrate 120 having the polymerized spacer material thereon may then be coated with a photoresist. A photomask for defining the spacers 130 may be aligned with the second substrate 120. The photomask may include a mask substrate formed of transparent material to form an exposed region, and may further include a barrier layer on the mask substrate to form a cutoff region. A photoresist pattern may be formed by carrying out an exposure process that selectively irradiates the photoresist with ultraviolet light through the photomask, and then developing the exposed photoresist. Referring to FIG. 5D, the spacers 130 having a predetermined height may be formed by patterning the spacer material using an etching process, the patterned photoresist serving as an etch mask.

Referring to FIG. 5E, the alignment layer 129 may then be formed on the second substrate 120. Forming the alignment layer 129 may include applying an alignment material layer, e.g., a polyimide layer, on the second substrate 120 and surrounding the spacers 130. An alignment pattern may then be formed in the alignment material layer using, e.g., a rubbing process, to produce the alignment layer 129. Due to the distance provided by the recesses in the color filters adjacent to the spacers 130, any nonuniformities in the alignment layer 129 resulting from the rubbing process in the vicinity of the spacers may not overlap the color filters 124, i.e., any such nonuniformities may overlap the enlarged portions of black matrix 122. Accordingly, the liquid crystal display device may exhibit little or no light leakage.

As described above, a liquid crystal display device according to embodiments may avoid the problems associated with the use of ball spacers. Further a liquid crystal display device according to embodiments may avoid the problem of light leakage associated with the use of a rubbing process in displays that incorporate patterned spacers. A liquid crystal display device according to embodiments may also provide an improved contrast ratio as compared to a passive matrix mode liquid crystal display device using the conventional ball spacers.

Example embodiments of the present invention have been disclosed herein, and although specific terms are employed, they are used and are to be interpreted in a generic and descriptive sense only and not for purpose of limitation. For instance, although a passive matrix mode liquid crystal display device is described in an example embodiment, an active matrix mode liquid crystal display device may be similarly provided. Additionally, although a striped pattern color filter is described in an example embodiment, other color filter patterns, e.g., mosaics, etc., may be similarly provided. Further, although a patterned spacer having a circular section is described in an example embodiment, other shapes, e.g., ovals, rectangles, etc. may be similarly provided. Accordingly, it will be understood by those of ordinary skill in the art that various changes in form and details may be made without departing from the spirit and scope of the present invention as set forth in the following claims.

What is claimed is:

1. A liquid crystal display device, comprising:
   a black matrix between first and second substrates, the black matrix having openings defined therein;
   color filters between the first and second substrates and aligned with the openings defined in the black matrix, the color filters including first filters having a first color, second filters having a second color, and third filters having a third color; and
   spacers configured to maintain a predetermined cell gap, wherein:
   the second filters have a recess, such that the second filters have an area that is less than an area of the first filters,
   the spacers are aligned with regions of the black matrix adjacent to the recesses in the second filters, and
   alignment layers are on the first and second substrates.

2. The liquid crystal display device as claimed in claim 1, wherein:
   the first substrate includes first electrodes extending in a first direction,
   the second substrate includes second electrodes extending in a second direction and crossing the first electrodes, and
   the openings in the black matrix correspond to overlapping regions of the first and second electrodes.

3. The liquid crystal display device as claimed in claim 2, wherein the first filters have a shape corresponding to the overlapping regions of the first and second electrodes.

4. The liquid crystal display device as claimed in claim 1, wherein:
   the color filters are arranged in a stripe pattern,
   the second filters are immediately adjacent to each other in a first direction, and
   the second filters alternate with the first and third filters in a second direction.

5. The liquid crystal display device as claimed in claim 4, wherein immediately adjacent second filters have recesses facing one another.

6. The liquid crystal display device as claimed in claim 5, wherein:

the black matrix includes first portions extending in the first direction, the black matrix includes second portions extending in the second direction and passing between the immediately adjacent second filters, the second portions are wider in regions between the facing recesses of the second filters than in regions between facing portions of immediately adjacent first filters, and the spacers are aligned with the wider regions.

7. The liquid crystal display device as claimed in claim 4, wherein:

the first substrate includes first electrodes extending in the first direction, the second substrate includes second electrodes extending in the second direction and crossing the first electrodes, and the openings in the black matrix correspond to overlapping regions of the first and second electrodes.

8. The liquid crystal display device as claimed in claim 4, wherein:

the first filters are not recessed, and the first color is red.

9. The liquid crystal display device as claimed in claim 1, wherein the recesses are defined by angled sides of the second filters.

10. A method of fabricating a liquid crystal display device, the method comprising:

forming a black matrix between first and second substrates, the black matrix having openings defined therein;

forming color filters between the first and second substrates such that the color filters are aligned with the openings defined in the black matrix, the color filters including first filters having a first color, second filters having a second color, and third filters having a third color;

forming spacers configured to maintain a predetermined cell gap, wherein:

the second filters are formed to have a recess, such that the second filters are formed with an area that is less than an area of the first filters, and the spacers are formed to be aligned with regions of the black matrix adjacent to the recesses in the second filters; and forming alignment layers on the first and second substrates.

11. The method as claimed in claim 10, wherein:

the first substrate includes first electrodes extending in a first direction, the second substrate includes second electrodes extending in a second direction and crossing the first electrodes, and the openings in the black matrix correspond to overlapping regions of the first and second electrodes.

12. The method as claimed in claim 11, wherein the first filters are formed to have a shape corresponding to the overlapping regions of the first and second electrodes.

13. The method as claimed in claim 10, wherein:

the color filters are arranged in a stripe pattern, the second filters are immediately adjacent to each other in a first direction, and the second filters alternate with the first and third filters in a second direction.

14. The method as claimed in claim 13, wherein immediately adjacent second filters are formed to have recesses facing one another.

15. The method as claimed in claim 14, wherein:

the black matrix includes first portions extending in the first direction, the black matrix includes second portions extending in the second direction and passing between the immediately adjacent second filters, the second portions are wider in regions between the facing recesses of the second filters than in regions between facing portions of immediately adjacent first filters, and the spacers are aligned with the wider regions.

16. The method as claimed in claim 13, wherein:

the first substrate includes first electrodes extending in the first direction, the second substrate includes second electrodes extending in the second direction and crossing the first electrodes, and the openings in the black matrix correspond to overlapping regions of the first and second electrodes.

17. The method as claimed in claim 13, wherein:

the first filters are not recessed, and the first color is red.

18. The method as claimed in claim 9, wherein the recesses are defined by angled sides of the second filters.

19. The method as claimed in claim 10, wherein forming the spacers includes:

forming a spacer material layer on the second substrate, and patterning the spacer material layer to form the spacers aligned with regions of the black matrix adjacent to the recesses in the second filters.

20. The method as claimed in claim 19, wherein forming the alignment layer on the second substrate includes performing a rubbing operation to form an alignment pattern after patterning the spacer material layer.

* * * * *